United States Patent
Bradford

[19]

[11] Patent Number: 5,958,225
[45] Date of Patent: Sep. 28, 1999

[54] FUEL FILTER SYSTEM

[75] Inventor: Peter Francis Bradford, Kent, United Kingdom

[73] Assignee: Lucas Industries, United Kingdom

[*] Notice: This patent is subject to a terminal disclaimer.

[21] Appl. No.: 08/938,529

[22] Filed: Sep. 26, 1997

[30] Foreign Application Priority Data

Sep. 28, 1996 [GB] United Kingdom ............... 9620298
Feb. 12, 1997 [GB] United Kingdom ............... 9702887

[51] Int. Cl.$^6$ .......................... F02M 37/22; B01D 35/18
[52] U.S. Cl. ...................... 210/149; 210/209; 210/418; 210/435
[58] Field of Search ................ 210/149, 433.1, 210/439, 444, 209, 418, 440, 435; 123/514; 236/93 R, 101 D

[56] References Cited

U.S. PATENT DOCUMENTS

| | | | |
|---|---|---|---|
| 4,683,055 | 7/1987 | Bosch et al. ........................... | 210/120 |
| 5,104,038 | 4/1992 | Cruces ................................... | 236/101 D |
| 5,685,278 | 11/1997 | Bradford et al. ..................... | 123/514 |

FOREIGN PATENT DOCUMENTS

| | | |
|---|---|---|
| 0 166 160 | 2/1986 | European Pat. Off. . |
| 2 031 994 | 4/1980 | United Kingdom . |

*Primary Examiner*—Matthew O. Savage
*Attorney, Agent, or Firm*—Fulbright & Jaworski L.L.P.

[57] ABSTRACT

A filter system is disclosed which comprises a housing having a first inlet and a first outlet. A filter element is located between the first inlet and the first outlet. A temperature sensitive valve controls communication between a first inlet side of the filter element communicating with the first inlet and a return line from a fuel pump so that when the fuel temperature is low, hot fuel returning from the pump is supplied to the first inlet side of the filter element. When the fuel temperature increases, the returned fuel is returned to the fuel reservoir rather than to the first side of the filter element.

5 Claims, 3 Drawing Sheets

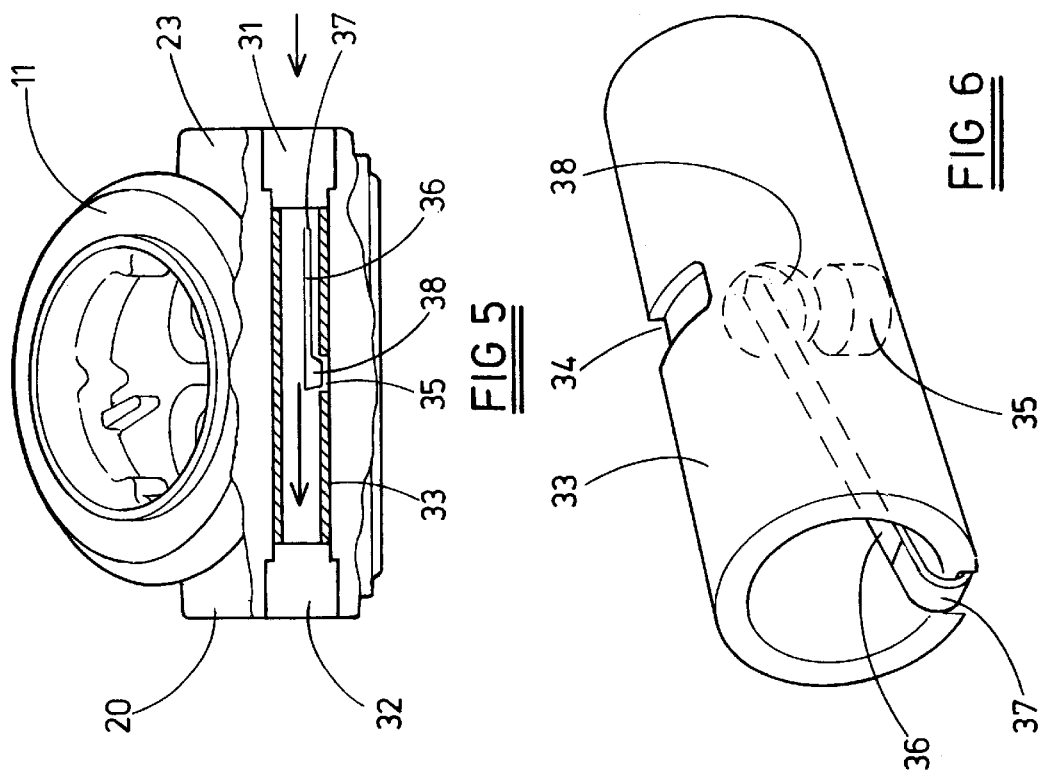
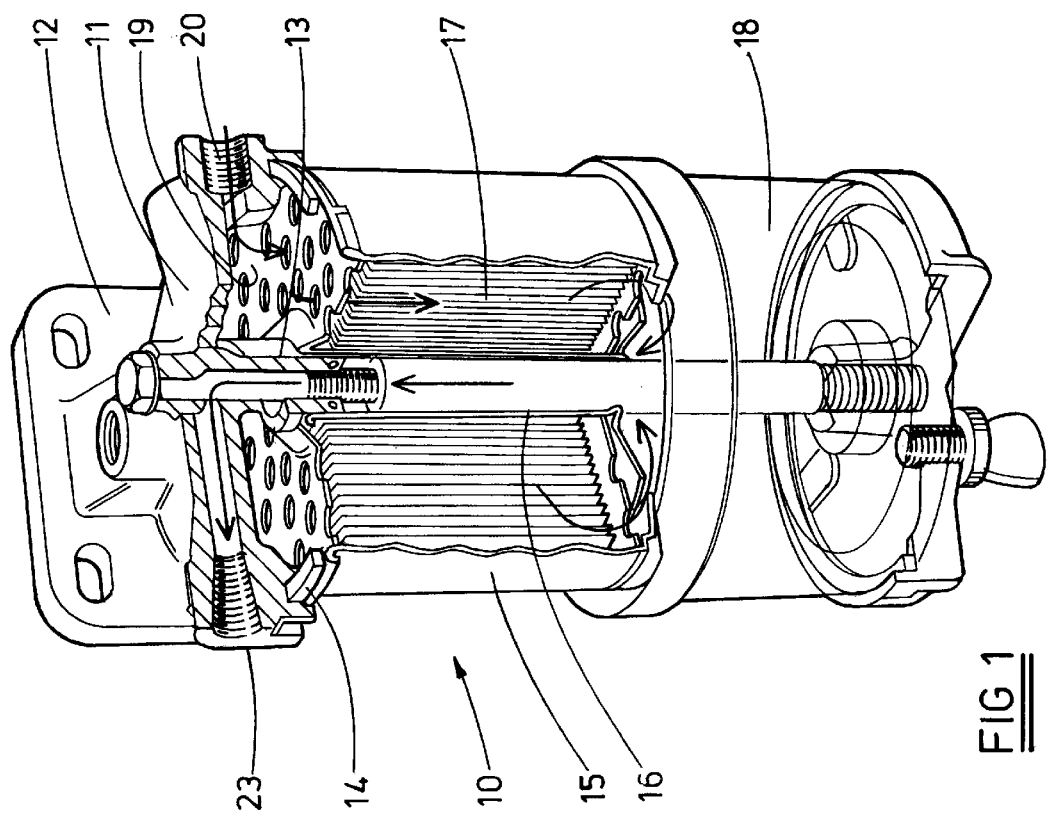

FUEL FILTER SYSTEM

This invention relates to a fuel filter system which forms part of a fuel supply system for a compression ignition engine, the filter system including a first inlet, a first outlet, and a fuel filter element interposed between the first inlet and the first outlet, fuel being drawn from a reservoir through the first inlet, the filter element, and the first outlet to a fuel pumping apparatus which supplies fuel to said engine in use.

Such fuel filter systems are well known in the art, the filter element incorporating a paper or like medium which retains dirt in the fuel. In cold weather conditions the filter element can be blocked by particles of wax forming in the fuel, to the extent that the supply of fuel to the pumping apparatus is prevented or substantially inhibited, and it is known to mix hot fuel which is returned from the housing of the pumping apparatus, with the cold fuel flowing through the first inlet, thereby to raise the temperature of the fuel in the filter a sufficient amount to inhibit formation of wax, and melt such wax as may have formed while the system is idle. It is recognised however that in hot weather conditions the mixing of hot fuel with fuel entering the first inlet can result in the supply of fuel to the pumping apparatus at a temperature which is too hot to permit effective operation of the pumping apparatus and the engine supplied thereby. This problem is particularly recognised in fuel systems where the pumping apparatus draws fuel through the filter since this results in reduced fuel pressure in the filter, and a tendency therefore for hot returned fuel to migrate automatically to the low pressure area.

It is an object of the present invention to provide a filter system capable of minimising the aforementioned problems in a simple and convenient form.

According to the present invention a filter system of the kind specified includes a temperature sensitive valve having an open condition in which communication is established between the first inlet side of the filter element and a fuel return line interconnecting the fuel pumping apparatus and the fuel reservoir in use, and a second, closed position in which said communication is prevented so that fuel returning, in use, from the pumping apparatus is returned directly to the reservoir.

Preferably said return line includes a region forming part of said filter system, said region having a port through which said line can communicate with the first inlet side of the filter element, said port being opened and closed by said temperature sensitive valve.

Preferably said filter system includes a housing containing said filter element, and supporting said first inlet and said first outlet, said housing also including said region of said return line.

Preferably said temperature sensitive valve includes a bimetallic operating member which may be in the form of a bimetallic coil.

Examples of the invention are illustrated in the accompanying drawings, wherein:

FIG. 1 is a diagrammatic representation of a fuel filter system,

Figure 2:
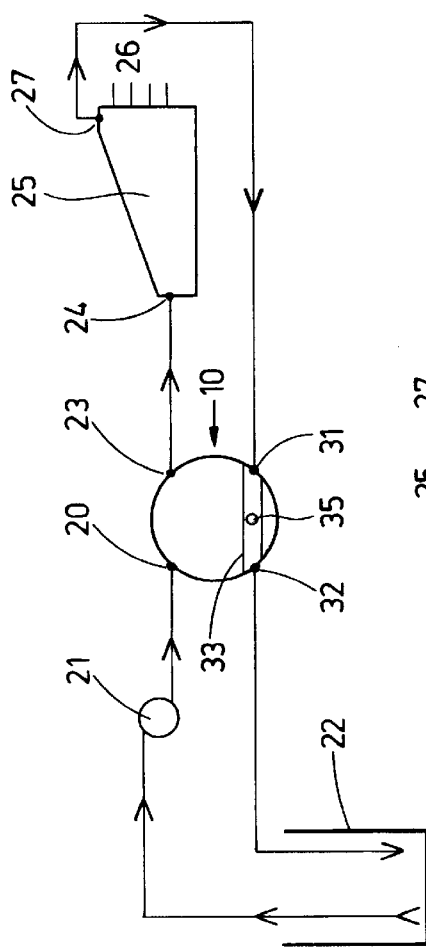
FIG. 2 is a diagrammatic representation of an engine fuel supply system.
Figure 3:
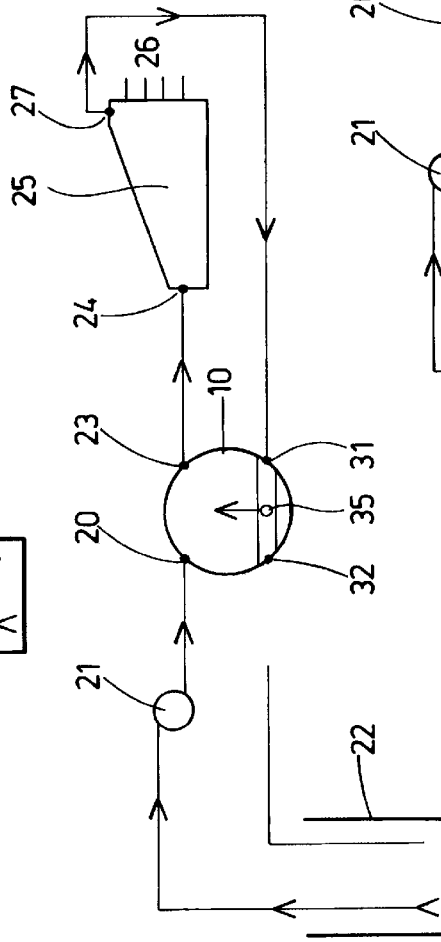
Figure 4:
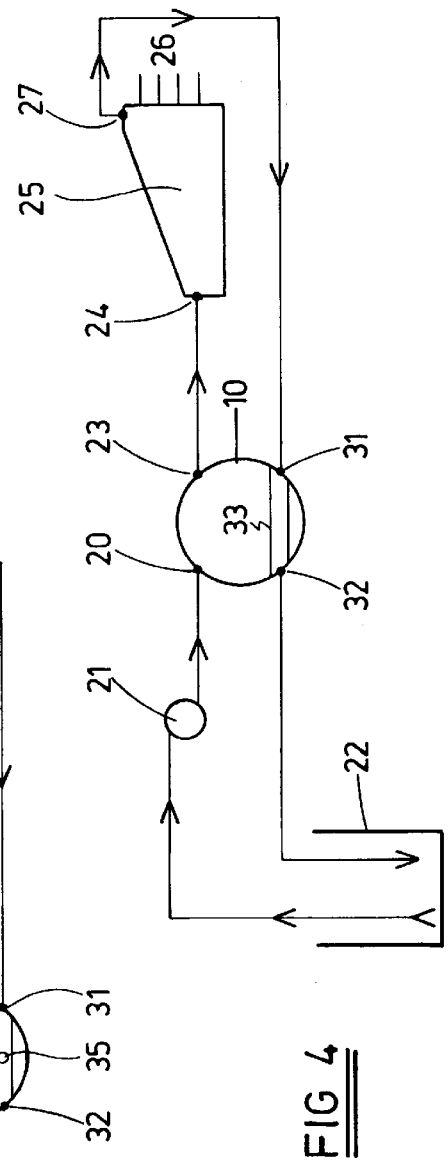
Figure 7:
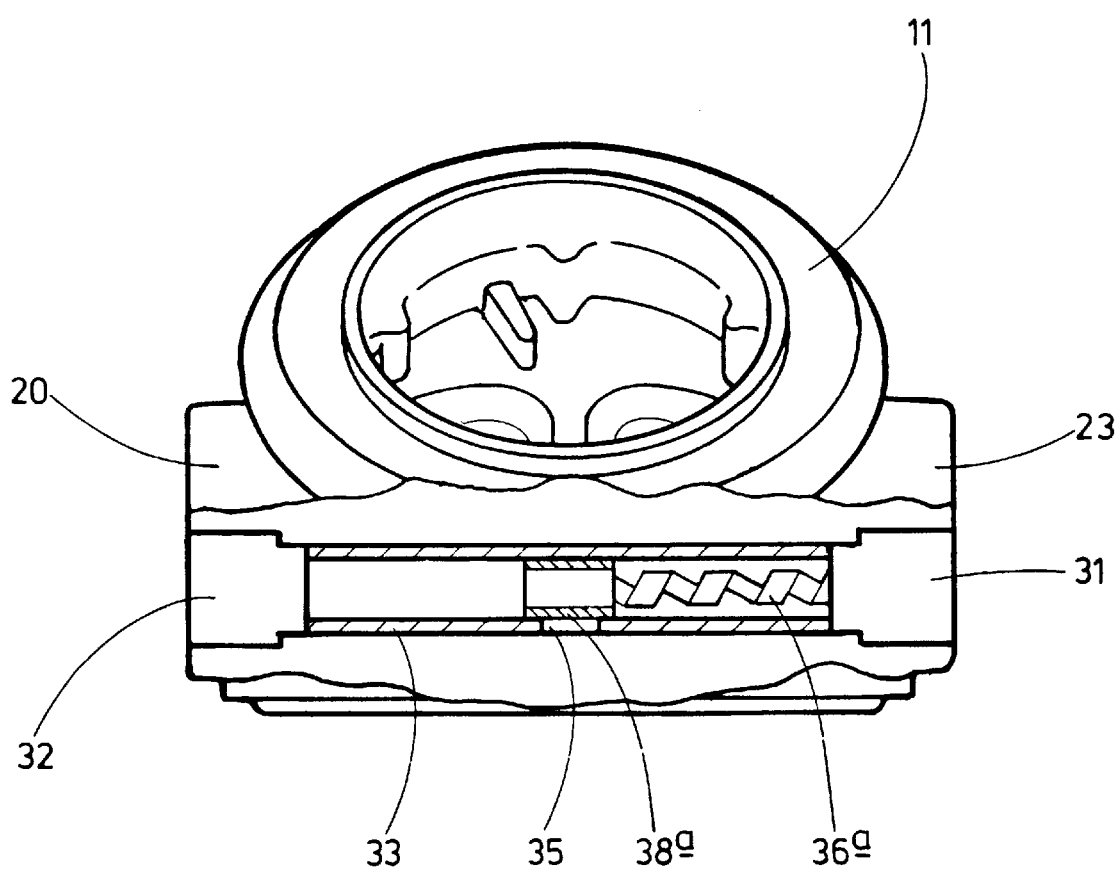

FIG. 3 is a representation similar to FIG. 2 but illustrating a cold operating condition, FIG. 4 is a view similar to FIGS. 2 and 3, but illustrating a hot operating condition, FIG. 5 is a diagrammatic representation of part of the filter system, FIG. 6 is an enlarged perspective view of a component of the filter system seen in FIG. 5, and FIG. 7 is a view similar to FIG. 5 illustrating an alternative embodiment.

Referring to the drawings, the filter system which is indicated by reference numeral 10 in FIG. 1, includes an upper support housing 11 provided with an integral support flange 12 whereby the system can be mounted on a suitable support surface. The support housing is provided with a hollow depending spigot 13 and it defines an annular recess which accommodates a sealing ring 14 and the upper edge of a filter element casing 15 within which is mounted about a central tube 16, an annular paper filter element 17. The upper and lower ends of the filter element are located between apertured plates respectively. The lower edge of the casing is held in sealing engagement with the rim of a bowl 18 and the bowl together with the casing are held in assembled relationship with the support housing 11 by means of a bolt which extends through the tube 16. The spigot 13 extends into the tube 16 in sealing relationship therewith.

The support housing defines a chamber 19 which communicates with a first inlet 20 and this is connected as shown in FIG. 2, through a sediment trap 21 of known form to a fuel reservoir or supply tank 22. The hollow spigot communicates with a first outlet 23 and this communicates as shown in FIG. 2, with the fuel inlet 24 of a fuel pumping apparatus 25. The pumping apparatus is provided with a plurality of outlets 26 which communicate with the fuel injection nozzles respectively of the associated engine. In use, during operation of the engine the pumping apparatus 25 draws fuel through the filter system 10 and the trap 21 from the fuel supply tank 22 and the fuel flows in the direction shown by the arrows in FIG. 1 that is to say downwardly through the filter element 17 into the bowl 18 and then upwardly through the tube 16 and the spigot to the outlet 23. Any dirt in the fuel is retained by the filter element 17 and water contained in the fuel tends to collect at the bottom of the bowl 18 from which it can be drained as and when required.

The pumping apparatus 25 is provided with an outlet 27 for fuel which collects within the housing of the apparatus due mainly to leakage but possibly due to a deliberate bleed of fuel. The fuel which leaves the outlet 27 is hot due mainly to the fact that work has been carried out on the fuel within the pumping apparatus. This fuel is returned to a second inlet port 31 on the support housing 11. As is apparent from FIG. 5, the second inlet port 31 communicates directly with a second outlet port 32 also formed on the support housing 11, by way of a tubular element 33 received in a through bore in the support housing 11 between the inlet 31 and outlet 32.

It is envisaged that the element 33 will be formed from a fuel resistant synthetic resin material, but it is to be recognised that it could be formed from other fuel resistant material. Moreover, it is anticipated that the element 33 will be held in position within the support housing 11 by means of a spring clip of appropriate shape, engaging both the support housing 11, and a recess 34 in the exterior of the element 33. Intermediate the ends of the element 33 the wall of the element 33 is formed with a cross drilling 35 which establishes communication between the interior of the element 33 and the chamber 19, that is to say establishes communication between the interior of the tubular element 33 and the interior of the filter system at the first inlet side of the filter element 17.

Disposed within the tubular element 33 is an elongate bimetal strip 36 secured by a clip 37 at one end, to one axial end of the element 33, and carrying at its other end a valve closure member 38 aligned with, and engageable in the cross drilling 35. The bimetal strip 36 is so arranged that at a temperature below a predetermined value the strip occupies a configuration in which the valve closure member 38 is held spaced from the inner wall of the element 33, so ensuring that the port defined by the cross drilling 35 is open, and communication exists between the interior of the element 33 and the chamber 19. When the temperature of the strip 36 is above the predetermined value then the strip flexes to a configuration in which the closure member 38 is engaged with the wall of the element 33, thus entering and closing the cross drilling 35. Accordingly, in this position of the bimetal strip there is no communication between the interior of the element 33 and the chamber 19 and fuel returned from the outlet 27 of the pumping apparatus 25 flows from the inlet 31 through the element 33 and out of the outlet 32 to be returned through a return line to the supply tank 22.

It will be recognised that when the pumping apparatus 25 is operative it draws fuel from the tank 22 through the trap 21, the first inlet 20, the chamber 19, the filter element 17, and the first outlet 23. It follows therefore that the fuel pressure within the chamber 19 is a reduced pressure, and in particular is below the pressure of fuel in the region of the fuel return line defined by the element 33. Thus if the valve 35, 38 is open the whole of the return flow will pass through the drilling 35 to mix with fuel arriving in the chamber 19 from the tank 22 by way of the first inlet 20. There will be no return flow from the second outlet 32 and this is the condition illustrated in FIG. 3, a break being shown in the line between the outlet 32 and the tank 22 to indicate that there is no flow at this time.

FIG. 4 illustrates the condition in which the closure member 38 engages in the cross drilling 35 to close the cross drilling, and shows the whole of the return flow from the pumping apparatus outlet 27 returning through the element 33 to the tank 22.

The operating temperature of the bimetal strip 36 is chosen such that the cross drilling 35 is held open when the temperature conditions in the chamber 19 and the supply housing 11 are such that wax formation in the fuel is likely. In these conditions therefore the heated fuel returning from the pumping apparatus 25 mixes in the chamber 19 with cold fuel drawn from the tank 22, thus heating the fuel contained within the chamber 19 to minimise the risk of wax formation, or to melt wax which may already have formed. As warmed fuel reaches the pumping apparatus 25, the temperature of the fuel return from the outlet 27 will increase and a point will be reached at which the temperature of the bimetal strip 36 is raised above the predetermined value so that the strip moves the member 38 to close the drilling 35. Thereafter the return flow passes directly to the tank 22. It will be noted that when the closure member 38 engages the drilling 35 it is urged to stay in its closed position both by the effect of the bimetal strip 36, and by the pressure differential existing between the higher pressure in the element 33 and the lower pressure in the chamber 19. It follows from this, that the temperature at which the bimetal strip 36 will exert sufficient force to open the drilling 35 is much lower than the temperature at which the strip 36 moves the member 38 to close the drilling 35. In practice this difference in temperature is useful since it avoids rapid opening and closing of the drilling 35, and in practice during normal operating conditions it is unlikely that the temperature of the fuel returning through the element 33 will fall below the temperature at which wax formation occurs unless the associated engine has been inoperative for a period of time in cold weather conditions, and thus normally the valve will not re-open the drilling 35 until there is a period of non-use.

The arrangement of FIG. 7 differs from that of FIG. 5 in that a coiled bimetal member 36*a* is secured at one end to one axial end of the element 33, and carries at its other end a valve closure member 38*a* in the form of a tubular member which is slidable within the element 33 between a first position (as shown in FIG. 7) in which it obscures the cross-drilling 35 and a second, retracted position in which the cross-drilling 35 is not obscured. The bimetal member 36*a* is so arranged that at a temperature below a predetermined value the member 38*a* occupies its second position. As the temperature of the member 36*a* increases, the member 38*a* moves towards its first position, closing the cross drilling 35. Accordingly, in this position there is no communication between the interior of the element 33 and the chamber 19, the member 38*a* forming a seal with the element 33 to prevent or substantially prevent fuel flow through the opening, and fuel returned from the outlet 27 of the pumping apparatus 25 flows from the inlet 31 through the element 33 and out of the outlet 32 to be returned through a return line to the supply tank 22.

As the bimetalic member 36*a* is in the form of a coil or spiral, located adjacent the inner surface of element 33, the flow of fuel through the element 33 is not significantly restricted by the presence of the member 36*a*. Similarly, the closure member 38*a* does not form a significant restriction to flow along the element 33.

Other than as described hereinbefore, the arrangement of FIG. 7 is identical to and operates in the same manner as that of FIG. 5.

In order to prevent air circulating between the filter and the pump, it is important to ensure that when the fuel temperature is sufficiently high to result in the drilling 35 being closed, not only does the valve prevent fuel flow to the filter through the drilling 35, but also air is prevented from being drawn to the filter. In this way, air is returned with the fuel to the fuel tank, thus the supply of air with the fuel to the pump is restricted to an acceptable level.

It is desirable to achieve a rapid initial increase in fuel temperature in order to minimise waxing problems, and this can be achieved by minimising the length of the pipework between the filter and the fuel pump, thus upon engine start-up, relatively high temperature fuel is returned to the filter by the fuel pump more quickly than if longer, high volume pipework were used.

I claim:

1. A filter system for use in a fuel system including a fuel reservoir, a fuel pumping apparatus drawing fuel from the reservoir, through the filter system, and a return line whereby fuel is returned from the fuel pumping apparatus, the filter system comprising a first inlet, a first outlet, a fuel filter element interposed between the first inlet and the first outlet, and a temperature sensitive valve having a first open position in which communication is established between the first inlet side of the filter element which communicates with the first inlet and the fuel return line, and a second closed position in which said communication is prevented so that fuel returning, in use, from the pumping apparatus is returned directly to the reservoir, wherein said return line includes a region forming part of said filter system, said region having a port through which said return line can communicate with the first inlet side of the filter element, said port being opened and closed by said temperature sensitive valve, in use, said filter system including a housing containing said filter system element and said temperature sensitive valve, and supporting said first inlet and said first outlet, said housing also including said region of said return line and wherein said temperature sensitive valve is disposed substantially within said return line at said region.

2. A filter system as claimed in claim 1, wherein the temperature sensitive valve includes a bimetallic operating member.

3. A filter system as claimed in claim 2, wherein said bimetallic operating member is in the form of a bimetallic strip.

4. A filter system as claimed in claim 2, wherein said bimetallic operating member is in the form of a bimetallic coil.

5. A filter system as claimed in claim 1, wherein the temperature sensitive valve assumes its open condition at low temperatures, and moves to its closed condition when the temperature rises above a predetermined level.

* * * * *